(12) United States Patent
Yamayoshi et al.

(10) Patent No.: US 11,491,586 B2
(45) Date of Patent: *Nov. 8, 2022

(54) ALUMINUM ALLOY BRAZING SHEET AND MANUFACTURING METHOD THEREOF

(71) Applicant: UACJ Corporation, Tokyo (JP)

(72) Inventors: Tomoki Yamayoshi, Tokyo (JP); Hidetoshi Kumagai, Tokyo (JP); Hirokazu Tanaka, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/287,293

(22) PCT Filed: Oct. 25, 2019

(86) PCT No.: PCT/JP2019/041897
§ 371 (c)(1),
(2) Date: Apr. 21, 2021

(87) PCT Pub. No.: WO2020/085488
PCT Pub. Date: Apr. 30, 2020

(65) Prior Publication Data
US 2021/0354250 A1     Nov. 18, 2021

(30) Foreign Application Priority Data
Oct. 26, 2018 (JP) .............................. JP2018-201413

(51) Int. Cl.
*B32B 15/01* (2006.01)
*B23K 35/02* (2006.01)
(Continued)

(52) U.S. Cl.
CPC ........ *B23K 35/0238* (2013.01); *B23K 35/288* (2013.01); *B32B 15/016* (2013.01);
(Continued)

(58) Field of Classification Search
None
See application file for complete search history.

(56) References Cited

U.S. PATENT DOCUMENTS

2010/0263768 A1* 10/2010 Hisatomi ............. B23K 1/0012
148/438

FOREIGN PATENT DOCUMENTS

| CN | 101469960 A | 7/2009 |
| CN | 108367395 A | 8/2018 |

(Continued)

OTHER PUBLICATIONS

Office Action dated Dec. 7, 2021, issued in counterpart CN Application No. 201980070793.5, with English Translation. (64 pages).

(Continued)

*Primary Examiner* — Daniel J. Schleis
(74) *Attorney, Agent, or Firm* — WHDA, LLP

(57) ABSTRACT

An aluminum alloy brazing sheet used for brazing of an aluminum material in an inert gas atmosphere or in vacuum is formed of a two-layer material in which a brazing material and a core material are stacked in this order. The core material is formed of an aluminum alloy and has a grain size of 20 to 300 μm, and the aluminum alloy contains Mn of 0.50 to 2.00 mass %, Mg of 0.40 to 2.00 mass %, Si of 1.50 mass % or less, and Fe of 1.00 mass % or less, with the balance being aluminum and inevitable impurities. The brazing material is formed of an aluminum alloy containing Si of 4.00 to 13.00 mass % with the balance being aluminum and inevitable impurities, and, in a drop-type fluidity test, a ratio α ($\alpha = K_a/K_b$) of a fluid coefficient $K_a$ is 0.50 or more.

15 Claims, 2 Drawing Sheets

(51) Int. Cl.
  *B23K 35/28* (2006.01)
  *C22C 21/02* (2006.01)
  *C22C 21/06* (2006.01)
  *C22F 1/043* (2006.01)
  *C22F 1/047* (2006.01)

(52) U.S. Cl.
  CPC .............. *C22C 21/02* (2013.01); *C22C 21/06* (2013.01); *C22F 1/043* (2013.01); *C22F 1/047* (2013.01)

(56) References Cited

FOREIGN PATENT DOCUMENTS

| | | |
|---|---|---|
| JP | 63-282230 A | 11/1988 |
| JP | 2004-358519 A | 12/2004 |
| JP | 2010-255013 A | 11/2010 |
| JP | 2013-194267 A | 9/2013 |
| WO | 2018/100793 A1 | 6/2018 |

OTHER PUBLICATIONS

International Search Report w/English translation and Written Opinion in Japanese dated Jan. 21, 2020, issued in counterpart International Application No. PCT/JP2019/041897 (9 pages).
Office Action dated Apr. 28, 2022, issued in counterpart CN Application No. 201980070793.5, with English Translation. (47 pages).

\* cited by examiner

ALUMINUM ALLOY BRAZING SHEET AND MANUFACTURING METHOD THEREOF

TECHNICAL FIELD

The present invention relates to an aluminum alloy brazing sheet used for brazing an aluminum material in an inert gas atmosphere or in vacuum without using a flux.

BACKGROUND ART

Brazing joint is widely used as a method for joining products including a number of minute joining portions, such as heat exchangers and machine components formed of aluminum. To execute brazing joint for aluminum materials (including aluminum alloy materials), it is indispensable to break an oxide film covering the surface of the material and bring the molten brazing material into contact with a base material or a similarly molten brazing material. Methods for breaking the oxide film of the aluminum material are broadly divided into methods of using a flux and methods of heating the material in vacuum, and both of them have been put to practical use.

Brazing joint has a wide application range. Heat exchangers for automobiles serve as the most representative product manufactured by brazing joint. Most of heat exchangers for automobiles, such as radiators, heaters, capacitors, and evaporators, are formed of aluminum, and most of them are manufactured by brazing joint. A method of applying a noncorrosive flux and heating the structure in nitrogen gas occupies the majority part of brazing joint at present.

However, in a flux brazing method, the cost for the flux and the cost required for the step of applying the flux increase, and serve as the cause for increase in cost for manufacturing heat exchangers. There is a method of manufacturing heat exchangers by vacuum brazing, but the vacuum brazing method requires high equipment cost and high maintenance cost for the heating furnace, and has the problem in productivity and/or brazing stability. For this reason, there are increasing needs for executing brazing joint in a nitrogen gas furnace without using a flux.

To meet the needs, for example, Patent Literature 1 proposes a method of diffusing Mg added to the core material into the brazing material, as a method enabling brazing joint in an inert gas atmosphere without using a flux by diffusing Mg into the brazing material during brazing heating. Patent Literature 1 discloses that the method prevents formation of an oxide film on the surface of the brazing material in manufacturing of the clad material and/or during brazing heating, and that Mg effectively acts on breakage of an oxide film on the surface of the brazing material.

PRIOR ART LITERATURES

Patent Literature

Patent Literature 1: Japanese Patent Application Laid-open No. 2004-358519

SUMMARY OF INVENTION

Problem to be Solved by Invention

However, the method of diffusing Mg added to the core material into the brazing material requires securing the solidus temperature of the core material equal to or more than the brazing temperature, and the Mg quantity that can be added to the core material is limited. For this reason, there are cases where no sufficient Mg quantity to break the oxide film in brazing can be added and good brazability cannot be secured.

In addition, even when the Mg quantity of the core material is limited, in the case where the grain size of the core material is small, there is the problem that the shape of the heat exchanger cannot be maintained because, for example, the core material is molten due to much diffusion of Si in the brazing material into the core material in brazing, or the core material is molten due to much diffusion of Si in the brazing material into the core material as a result of remaining subgrains in a low-processed portion at the time when pressing or the like is executed in brazing.

Accordingly, an object of the present invention is to provide an aluminum alloy brazing sheet achieving excellent brazability. With the aluminum alloy brazing sheet, in the case of brazing an aluminum material in an inert gas atmosphere, such as a nitrogen gas atmosphere, or in vacuum without using a flux, Mg is promptly supplied into the brazing material in brazing heating and sufficiently eluted into the molten brazing material after melting of the brazing material is started. This enables efficient breakage of the oxide film on the surface of the brazing material, and suppresses diffusion of Si in the brazing material into the core material in brazing heating.

Means for Solving the Problem

The problem described above is solved with the following present invention.

Specifically, the present invention (1) provides an aluminum alloy brazing sheet used for brazing of an aluminum material in an inert gas atmosphere or in vacuum and formed of a two-layer material in which a brazing material and a core material are stacked in this order, the core material being formed of an aluminum alloy and having a grain size of 20 to 300 μm, the aluminum alloy comprising Mn of 0.50 to 2.00 mass %, Mg of 0.40 to 2.00 mass %, Si of 1.50 mass % or less, and Fe of 1.00 mass % or less, with the balance being aluminum and inevitable impurities, the brazing material being formed of an aluminum alloy comprising Si of 4.00 to 13.00 mass % with the balance being aluminum and inevitable impurities, and in a drop-type fluidity test, a ratio $\alpha(\alpha=K_a/K_b)$ of a fluid coefficient $K_a$ after a 5% strain is applied to a fluid coefficient $K_b$ before the strain is applied being 0.50 or more.

The present invention (2) provides the aluminum alloy brazing sheet of (1), wherein the brazing material further comprises one or two or more of Bi of 1.00 mass % or less, Na of 0.050 mass % or less, Sr of 0.050 mass % or less, Mg of 2.00 mass % or less. Zn of 8.00 mass % or less, Cu of 4.00 mass % or less, In of 0.100 mass % or less, Sn of 0.100 mass % or less, and Fe of 1.00 mass % or less.

The present invention (3) provides the aluminum alloy brazing sheet of (1) or (2), wherein the core material further comprises one or two or more of Ti less than 0.10 mass %, Cu of 1.20 mass % or less, Zr of 0.30 mass % or less, and Cr of 0.30 mass % or less.

The present invention (4) provides an aluminum alloy brazing sheet used for brazing of an aluminum material in an inert gas atmosphere or in vacuum and formed of a three-layer material in which a brazing material, a core material, and a brazing material are stacked in this order, the core material being formed of an aluminum alloy and having a grain size of 20 to 300 μm, the aluminum alloy comprising Mn of 0.50 to 2.00 mass %, Mg of 0.40 to 2.00 mass %, Si of 1.50 mass % or less, and Fe of 1.00 mass % or less, with the balance being aluminum and inevitable impurities, each of the brazing materials being formed of an aluminum alloy comprising Si of 400 to 13.00 mass % with the balance being aluminum and inevitable impurities, and in a drop-type fluidity test, a ratio α ($\alpha=K_a/K_bK$) of a fluid coefficient Km after a 5% strain is applied to a fluid coefficient $K_b$ before the strain is applied being 0.50 or more.

The present invention (5) provides the aluminum alloy brazing sheet of (4), wherein the brazing material further comprises one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less.

The present invention (6) provides the aluminum alloy brazing sheet of (4) or (5), wherein the core material further comprises one or two or more of Ti less than 0.10 mass %. Cu of 1.20 mass % or less, Zr of 0.30 mass % or less, and Cr of 0.30 mass % or less.

The present invention (7) provides an aluminum alloy brazing sheet used for brazing of an aluminum material in an inert gas atmosphere or in vacuum and formed of a three-layer material in which a brazing material, a core material, and a sacrificial anode material are stacked in this order, the core material being formed of an aluminum alloy and having a grain size of 20 to 300 μm, the aluminum alloy comprising Mn of 0.50 to 2.00 mass %, Mg of 0.40 to 2.00 mass %, Si of 1.50 mass % or less, and Fe of 1.00 mass % or less, with the balance being aluminum and inevitable impurities, the brazing material being formed of an aluminum alloy comprising Si of 4.00 to 13.00 mass % with the balance being aluminum and inevitable impurities, the sacrificial anode material being formed of aluminum or an aluminum alloy comprising Zn of 8.00 mass % or less with the balance being aluminum and inevitable impurities, and in a drop-type fluidity test, a ratio $\alpha(\alpha=K_a/K_b)$ of a fluid coefficient $K_a$ after a 5% strain is applied to a fluid coefficient $K_b$ before the strain is applied being 0.50 or more.

The present invention (8) provides the aluminum alloy brazing sheet of (7), wherein the sacrificial anode material further comprises one or two or more of Mn of (2.0) mass % or less. Mg of 3.00 mass % or less, Si of 1.50 mass % or less, Fe of 1.00 mass % or less, Cu of 1.00 mass % or less, Ti of 0.30 mass % or less, Zr of 0.30 mass % or less, Cr of 0.30 mass % or less, In of 0.100 mass % or less, and Sn of 0.100 mass % or less.

The present invention (9) provides the aluminum alloy brazing sheet of (7) or (8), wherein the brazing material further comprises one or two or more of Bi of 1.00 mass % or less. Na of 0.050 mass % or less, Sr of 0.050 mass % or less, Mg of 2.00 mass % or less, Zn of 8.00 mass % or less, Cu of 4.00 mass % or less. In of 0.100 mass % or less, Sn of 0.100 mass % or less, and Fe of 1.00 mass % or less.

The present invention (10) provides the aluminum alloy brazing sheet of any one of (7) to (9), wherein the core material further comprises one or two or more of Ti less than 0.10 mass %, Cu of 1.20 mass % or less, Zr of 0.30 mass % or less, and Cr of 0.30 mass % or less.

The present invention (11) provides a method for manufacturing the aluminum alloy brazing sheet of any one of (1) to (3), the method comprising executing at least hot working, cold working, one or more intermediate annealings between rolling passes in the cold working, and final annealing after the last pass of the cold working on a stacked structure acquired by stacking a brazing material ingot and a core material ingot in this order to acquire the aluminum alloy brazing sheet, wherein the core material ingot is formed of an aluminum alloy comprising Mn of 0.50 to 200 mass %, Mg of 0.40 to 2.00 mass %, Si of 1.50 mass % or less, and Fe of 100 mass % or less, with the balance being aluminum and inevitable impurities, the brazing material ingot is formed of an aluminum alloy comprising Si of 4.00 to 13.00 mass % with the balance being aluminum and inevitable impurities, and a working ratio (working ratio=$((t_a-t_b)/t)\times100$) of a thickness $t_b$ before the final annealing to a thickness $t_a$ after the last intermediate annealing among the intermediate annealings is 20 to 70%.

The present invention (12) provides the method for manufacturing the aluminum alloy brazing sheet of (11), wherein the brazing material ingot further comprises one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less.

The present invention (13) provides the method for manufacturing the aluminum alloy brazing sheet of (11) or (12), wherein the core material ingot further comprises one or two or more of Ti less than 0.10 mass %, Cu of 1.20 mass % or less, Zr of 0.30 mass % or less, and Cr of 0.30 mass % or less.

The present invention (14) provides a method for manufacturing the aluminum alloy brazing sheet of any one of (4) to (6), the method comprising executing at least hot working, cold working, one or more intermediate annealings between rolling passes in the cold working, and final annealing after the last pass of the cold working on a stacked structure acquired by stacking a brazing material ingot, a core material ingot, and a brazing material ingot in this order to acquire the aluminum alloy brazing sheet, wherein the core material ingot is formed of an aluminum alloy comprising Mn of 0.50 to 2.00 mass %, Mg of 0.40 to 2.00 mass %, Si of 1.50 mass % or less, and Fe of 1.0 mass % or less, with the balance being aluminum and inevitable impurities, each of the brazing material ingots is formed of an aluminum alloy comprising Si of 4.00 to 13.00 mass % with the balance being aluminum and inevitable impurities, and a working ratio (working ratio=$t_a-t_b)/t_a)\times100$) of a thickness $t_b$ before the final annealing to a thickness $t_a$ after the last intermediate annealing among the intermediate annealings is 20 to 70%.

The present invention (15) provides the method for manufacturing the aluminum alloy brazing sheet of (14), wherein the brazing material ingot further comprises one or two or more of Bi of 1.00 mass % or less, Na of 0.050 mass % or less, Sr of 0.050 mass % or less. Mg of 2.00 mass % or less, Zn of 8.00 mass % or less, Cu of 4.00 mass % or less, In of 0.100 mass % or less, Sn of 0.100 mass % or less, and Fe of 1.00 mass % or less.

The present invention (16) provides the method for manufacturing the aluminum alloy brazing sheet of (14) or (15), wherein the core material ingot further comprises one or two or more of Ti less than 0.10 mass %, Cu of 1.20 mass % or less, Zr of 0.30 mass % or less, and Cr of 0.30 mass % or less.

The present invention (17) provides a method for manufacturing the aluminum alloy brazing sheet of any one of (7) to (10), the method comprising executing at least hot working, cold working, one or more intermediate annealings between rolling passes in the cold working, and final annealing after the last pass of the cold working on a stacked structure acquired by stacking a brazing material ingot, a core material ingot, and a sacrificial anode material ingot in this order to acquire the aluminum alloy brazing sheet, wherein the core material ingot is formed of an aluminum alloy comprising Mn of 0.50 to 2.00 mass %, Mg of 0.40 to 2.00 mass %, Si of 1.50 mass % or less, and Fe of 1.00 mass % or less, with the balance being aluminum and inevitable impurities, the brazing material ingot is formed of an aluminum alloy comprising Si of 4.00 to 13.00 mass % with the balance being aluminum and inevitable impurities, the sacrificial anode material ingot is formed of aluminum or an aluminum alloy comprising Zn of 8.00 mass % or less with the balance being aluminum and inevitable impurities, and a working ratio (working ratio=$((t_a-t_b)/t_a)\times 100$) of a thickness to before the final annealing to a thickness $t_a$ after the last intermediate annealing among the intermediate annealings is 20 to 70%.

The present invention (18) provides the method for manufacturing the aluminum alloy brazing sheet of (17), wherein the sacrificial anode material ingot further comprises one or two or more of Mn of 2.00 mass % or less, Mg of 3.00 mass % or less. Si of 1.50 mass % or less, Fe of 1.00 mass % or less, Cu of 1.00 mass % or less, Ti of 0.30 mass % or less, Zr of 0.30 mass % or less, Cr of 0.30 mass % or less, In of 0.100 mass % or less, and Sn of 0.100 mass % or less.

The present invention (19) provides the method for manufacturing the aluminum alloy brazing sheet of (17) or (18), wherein the brazing material ingot further comprises one or two or more of Bi of 1.00 mass % or less, Na of 0.050 mass % or less, Sr of 0.050 mass % or less, Mg of 2.0 mass % or less, Zn of 8.00 mass % or less, Cu of 4.00 mass % or less, in of 0.100 mass % or less, Sn of 0.100 mass % or less, and Fe of 1.00 mass % or less.

The present invention (20) provides the method for manufacturing the aluminum alloy brazing sheet of any one of (17) to (19), wherein the core material ingot further comprises one or two or more of Ti less than 0.10 mass %, Cu of 1.20 mass % or less, Zr of 0.30 mass % or less, and Cr of 0.30 mass % or less.

The present invention (21) provides the method for manufacturing the aluminum alloy brazing sheet of any one of (11) to (20), wherein a time for which the structure is maintained at 300° C. or more is three hours or more, a time for which the structure is maintained at 340° C. or more is one hour or more, and cooling speed is 300° C./hour or less in the intermediate annealings.

The present invention (22) provides the method for manufacturing the aluminum alloy brazing sheet of any one of (11) to (21), wherein a time for which the structure is maintained at 300° C. or more is three hours or more, a time for which the structure is maintained at 340° C. or more is one hour or more, and cooling speed is 300° C./hour or less in the final annealing.

Effects of Invention

The present invention provides an aluminum alloy brazing sheet achieving excellent brazability. With the aluminum alloy brazing sheet, in the case of brazing an aluminum material in an inert gas atmosphere, such as a nitrogen gas atmosphere, or in vacuum without using a flux, Mg is promptly supplied into the brazing material in brazing heating and sufficiently eluted into the molten brazing material after melting of the brazing material is started. This enables efficient breakage of the oxide film on the surface of the brazing material, and suppresses diffusion of Si in the brazing material into the core material in brazing heating.

EMBODIMENTS OF INVENTION

Figure 1:
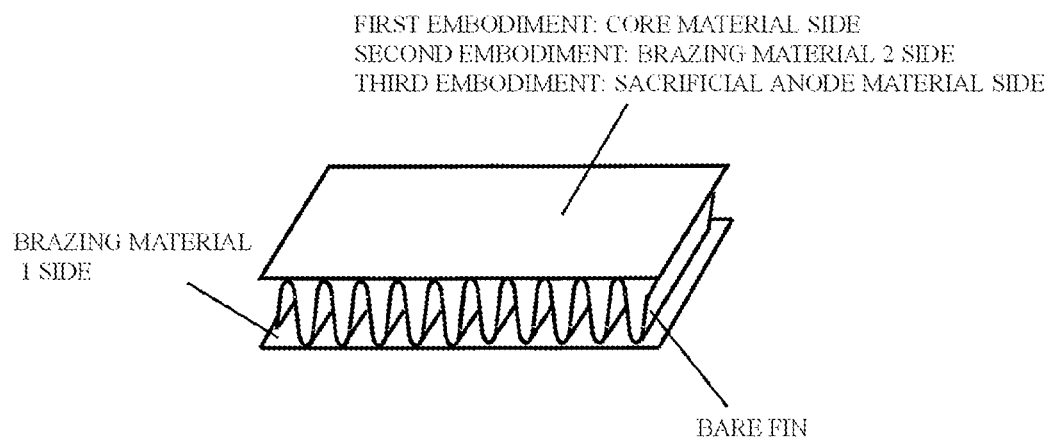
FIG. 1 is a diagram illustrating a miniature core prepared in an example.

Aluminum Alloy Brazing Sheet According to First Embodiment of Present Invention

An aluminum alloy brazing sheet according to the first embodiment of the present invention is an aluminum alloy brazing sheet used for brazing of an aluminum material in an inert gas atmosphere or in vacuum and formed of a two-layer material in which a brazing material and a core material are stacked in this order.

The core material is formed of an aluminum alloy and has a grain size of 20 to 300 μm, the aluminum alloy comprises Mn of 0.50 to 2.00 mass %, Mg of 0.40 to 2.00 mass %, Si of 1.50 mass % or less, and Fe of 1.00 mass % or less, with the balance being aluminum and inevitable impurities.

The brazing material is formed of an aluminum alloy comprising Si of 4.00 to 13.00 mass % with the balance being aluminum and inevitable impurities.

In a drop-type fluidity test, a ratio α ($\alpha=K_a/K_b$) of a fluid coefficient $K_a$ after a 5% strain is applied to a fluid coefficient $K_b$ before the strain is applied is 0.50 or more.

The aluminum alloy brazing sheet according to the first embodiment of the present invention is formed of a two-layer material in which a brazing material and a core material are stacked in this order. Specifically, the aluminum alloy brazing sheet according to the present invention is a clad material in which a brazing material is cladded onto one side surface of the core material.

The core material of the aluminum alloy brazing sheet according to the first embodiment of the present invention is formed of an aluminum alloy comprising Mn of 0.50 to 2.00 mass %, Mg of 0.40 to 2.00 mass %, Si of 1.50 mass % or less, and Fe of 1.00 mass % or less, with the balance being aluminum and inevitable impurities.

The core material comprises Mn. Mn included in the core material forms Al—Fe—Mn based, Al—Mn—Si based, and Al—Fe—Mn—Si based intermetallic compounds together with Fe and Si, and acts to achieve dispersion strengthening, or is dissolved into the matrix to improve the material strength by solid solution strengthening. Mn included in the core material also exhibits the effect of setting the potential noble to increase the difference in potential from the sacrificial anode material and/or the fin so as to improve the anticorrosion effect by the sacrificial anode effect. The Mn content in the core material is 0.50 to 2.00 mass % and preferably 0.60 to 1.50 mass %. When the Mn content in the core material exceeds the range described above, giant intermetallic compounds are easily generated in casting and the plastic workability is reduced. By contrast, when the Mn content in the core material is less than the range described above, sufficient strength and sufficient anticorrosion effect cannot be acquired.

The core material comprises Mg. Mg included in the core material is dissolved into the matrix to improve the material strength by solid solution strengthening. In addition, Mg included in the core material reacts with Si to exhibit the effect for strength improvement by age precipitation of the $Mg_2Si$ compound. Besides, because Mg has lower free energy of oxide formation than that of aluminum, Mg included in the core material is diffused into the brazing material in brazing heating to break the oxide film of aluminum covering the surface of the brazing material. The Mg content in the core material is 0.40 to 2.00 mass %, preferably 0.50 to 1.50 mass %, particularly preferably 0.70 to 1.10 mass %. By contrast, when the Mg content in the core material is less than the range described above, the Mg content diffused and eluted into the brazing material becomes insufficient, and the effect of breaking the oxide film on the surface of the brazing material becomes insufficient. In addition, the Mg content exceeding the range described above lowers the solidus temperature (melting point) of the core material, and increases the possibility of causing melting of the core material in brazing.

The core material comprises Si. Si included in the core material forms Al—Mn—Si based, Al—Fe—Si based, and Al—Fe—Mn—Si based compounds together with Fe and Mn, and acts to achieve dispersion strengthening, or is dissolved into the matrix to improve the material strength by solid solution strengthening. In addition, Si included in the core material reacts with Mg to exhibit the effect for strength improvement by age precipitation of the $Mg_2Si$ compound. The Si content in the core material is 1.50 mass % or less, preferably 0.05 to 1.50 mass %, and particularly preferably 0.20 to 1.00 mass %. The Si content in the core material exceeding the range described above lowers the solidus temperature (melting point) of the core material, and increases the possibility of causing melting of the core material in brazing.

The core material comprises Fe. Fe included in the core material forms Al—Fe—Mn based, Al—Fe—Si based, and Al—Fe—Mn—Si based compounds together with Mn and Si, acts to achieve dispersion strengthening, and improves the material strength. The Fe content in the core material is 1.00 mass % or less, preferably 0.05 to 1.00 mass %, and particularly preferably 0.05 to 0.70 mass %. When the Fe content in the core material exceeds the range described above, giant intermetallic compounds are easily generated in casting and the plastic workability is reduced.

The core material may further comprise one or two or more of Ti, Cu, Zr, and Cr.

Ti included in the core material miniaturizes the grain size of the ingot in casting, and suppresses casting cracks. When the core material comprises Ti, the Ti content in the core material is less than 0.10 mass % and preferably 0.05 mass % or more and less than 0.10 mass %.

Cu included in the core material improves the material strength by solid solution strengthening. Cu included in the core material also exhibits the effect of setting the potential noble to increase the difference in potential from the sacrificial anode material and/or the fin so as to improve the anticorrosion effect by the sacrificial anode effect. When the core material comprises Cu, the Cu content in the core material is 1.20 mass % or less and preferably 0.05 to 0.80 mass %. The Cu content in the core material exceeding the range described above increases the possibility of occurrence of intergranular corrosion, and increases the possibility of melting of the core material due to decrease in melting point thereof.

Zr included in the core material improves strength by solid solution strengthening, and precipitates Al—Zr based minute compounds to act on grain coarsening after brazing. When the core material comprises Zr, the Zr content in the core material is 0.30 mass % or less and preferably 0.10 to 0.20 mass %. When the Zr content in the core material exceeds the range described above, giant intermetallic compounds are easily formed in casting, and plastic workability is reduced.

Cr included in the core material improves strength by solid solution strengthening, and precipitates Al—Cr based minute compounds to act on grain coarsening after brazing. When the core material comprises Cr, the Cr content in the core material is 0.30 mass % or less and preferably 0.10 to 0.20 mass %. When the Cr content in the core material exceeds the range described above, giant intermetallic compounds are easily formed in casting, and plastic workability is reduced.

The grain size of the core material is 20 to 300 μm and preferably 50 to 200 μm. With the grain size of the core material falling within the range described above, excellent brazability is achieved. When the grain size of the core material is small, Si included in the brazing material directly cladded onto the core material is easily diffused in the vicinity of the grain boundary of the core material. This decreases the brazing material quantity and lowers the brazability. When the grain size of the core material is large, the diffusion quantity of Si is suppressed. The grain size of the core material less than the range described above lowers the brazability. The grain size exceeding the range described above causes a rough surface when the aluminum alloy brazing sheet is subjected to plastic working. The grain size of the core material can be set to the range described above by setting the working ratio (working ratio=$((t_a-t_b)/t_a)\times 100$) of a thickness $t_b$ before the final annealing to a thickness to after the last intermediate annealing among intermediate annealings executed between passes of cold working to 20 to 70%, in the manufacturing process of the aluminum alloy brazing sheet. In addition, in the intermediate annealing or the final annealing, the time for which the structure is maintained at 300° C. or more is three hours or more, the time for which the structure is maintained at 340° C. or more is one hour or more, and cooling speed is 300° C./hour or less. This lowers the solid solubility of Mg, suppresses collection of transfer at the time when a 5% strain is applied before brazing, and suppresses miniaturization of the grain size.

The brazing material of the aluminum alloy brazing sheet according to the first embodiment of the present invention is formed of an aluminum alloy comprising Si of 4.00 to 13.00 mass % with the balance being aluminum and inevitable impurities.

The Si content in the brazing material is 4.00 to 13.00 mass %. When the Si content in the brazing material is less than the range described above, no sufficient brazability is acquired. The Si content exceeding the range described above causes easy formation of coarse proeutectic Si in casting, causes easy occurrence of cracks in manufacturing of the material, and lowers plastic workability.

The brazing material may further comprise Bi. Bi included in the brazing material promotes breakage of the oxide film with Mg supplied from the core material to the brazing material in brazing heating, and improves the brazability. When the brazing material comprises Bi, the Bi content in the brazing material is 1.00 mass % or less and preferably 0.004 to 0.50 mass %. The Bi content in the brazing material exceeding the range described above causes cracks in hot rolling, and causes difficulty in manufacturing.

The brazing material may further comprise one or two of Na and Sr. Na or Sr is added to the brazing material to miniaturize the Si particles. When the brazing material comprises Na, the Na content in the brazing material is 0.050 mass % or less, preferably 0.003 to 0.050 mass %, and particularly preferably 0.005 to 0.030 mass %. When the brazing material comprises Sr, the Sr content in the brazing material is 0.050 mass % or less, preferably 0.003 to 0.050 mass %, and particularly preferably 0.005 to 0.030 mass %.

The brazing material may further comprise Mg. Mg in the brazing material breaks an aluminum oxide film covering the surface of the brazing material, and improves the brazability. When the brazing material comprises Mg, the Mg content in the brazing material is 2.00 mass % or less, and preferably 0.01 to 1.00 mass %. When the Mg content in the brazing material exceeds the range described above, MgO is formed on the surface of the brazing material before the brazing material is molten during brazing heating, and the brazability is lowered.

The brazing material may further comprise one or two of Zn and Cu. Zn and Cu in the brazing material lowers the melting point of the brazing material, and enables brazing at a temperature lower than 600° C. serving as an ordinary brazing temperature. When the brazing material comprises Zn, the Zn content in the brazing material is 8.00 mass % or less, preferably 0.50 to 8.00 mass %, and particularly preferably 2.00 to 4.00 mass %. When the brazing material comprises Cu, the Cu content in the brazing material is 4.00 mass % or less and preferably 1.00 to 3.00 mass %.

The brazing material may further comprise one or two of In and Sn. In and Sn in the brazing material sets the natural potential of the material lessnoble, and exhibits the sacrificial anticorrosion effect. When the brazing material comprises in, the In content in the brazing material is 0.100 mass % or less, preferably 0.005 to 0.100 mass %, and particularly preferably 0.010 to 0.050 mass %. When the brazing material comprises Sn, the Sn content in the brazing material is 0.100 mass % or less, preferably 0.005 to 0.100 mass %, and particularly preferably 0.010 to 0.050 mass %.

The brazing material may further comprise Fe of 1.00 mass % or less, and preferably 0.05 to 0.50 mass %.

The aluminum alloy brazing sheet according to the first embodiment of the present invention has a structure in which, in a drop-type fluidity test, a ratio α ($\alpha=K_a/K_b$) of a fluid coefficient $K_a$ after a 5% strain is applied to a fluid coefficient $K_b$ before the strain is applied is 0.50 or more and preferably 0.60 or more. In a drop-type fluidity test, when the ratio α ($\alpha=K_a/K_b$) of a fluid coefficient $K_a$ after a 5% strain is applied to a fluid coefficient $K_b$ before the strain is applied falls within the range described above, erosion rarely occurs in brazing heating. By contrast, in a drop-type fluidity test, when the ratio α ($\alpha=K_a/K_b$) of a fluid coefficient $K_a$ after a 5% strain is applied to a fluid coefficient $K_b$ before the strain is applied is less than the range described above, erosion occurs in brazing heating. The method for measuring the ratio α ($\alpha=K_a/K_b$) of the fluid coefficient $K_a$ after a 5% strain is applied to the fluid coefficient $K_b$ before the strain is applied in a drop-type fluidity test will be described later.

Aluminum Alloy Brazing Sheet According to Second Embodiment of Present Invention An aluminum alloy brazing sheet according to the second embodiment of the present invention is an aluminum alloy brazing sheet used for brazing of an aluminum material in an inert gas atmosphere or in vacuum and formed of a three-layer material in which a brazing material, a core material, and a brazing material are stacked in this order.

The core material is formed of an aluminum alloy and has a grain size of 20 to 300 μm, the aluminum alloy comprises Mn of 0.50 to 2.00 mass %, Mg of 0.40 to 2.00 mass %, Si of 1.50 mass % or less, and Fe of 1.00 mass % or less, with the balance being aluminum and inevitable impurities.

Each of the brazing materials is formed of an aluminum alloy comprising Si of 4.00 to 13.00 mass % with the balance being aluminum and inevitable impurities.

In a drop-type fluidity test, a ratio α ($\alpha=K_a/K_b$) of a fluid coefficient $K_a$ after a 5% strain is applied to a fluid coefficient $K_b$ before the strain is applied is 0.50 or more.

The aluminum alloy brazing sheet according to the second embodiment of the present invention is formed of a three-layer material in which a brazing material 1, a core material, and a brazing material 2 are stacked in this order. Specifically, the aluminum alloy brazing sheet according to the second embodiment of the present invention is a clad material in which the brazing material 1 is cladded onto one side surface of the core material and the brazing material 2 is cladded onto the other side surface of the core material. In the aluminum alloy brazing sheet according to the second embodiment of the present invention, the brazing material 1 and the brazing material 2 may have the same chemical composition or different chemical compositions.

The core material and the brazing materials (brazing material 1 and brazing material 2) according to the aluminum alloy brazing sheet according to the second embodiment of the present invention are the same as the core material and the brazing material of the aluminum alloy brazing sheet according to the first embodiment of the present invention.

The aluminum alloy brazing sheet according to the second embodiment of the present invention has a structure in which, in a drop-type fluidity test, a ratio α ($\alpha=K_a/K_b$) of a fluid coefficient $K_a$ after a 5% strain is applied to a fluid coefficient $K_b$ before the strain is applied is 0.50 or more and preferably 0.60 or more. In a drop-type fluidity test, when the ratio α ($\alpha=K_a/K_b$) of a fluid coefficient $K_a$ after a 5% strain is applied to a fluid coefficient $K_b$ before the strain is applied falls within the range described above, erosion rarely occurs in brazing heating. By contrast, in a drop-type fluidity test, when the ratio α ($\alpha=K_a/K_b$) of a fluid coefficient $K_a$ after a 5% strain is applied to a fluid coefficient $K_b$ before the strain is applied is less than the range described above, erosion occurs in brazing heating. The method for measuring the ratio α ($\alpha=K_a/K_b$) of the fluid coefficient $K_a$ after a 5% strain is applied to the fluid coefficient $K_b$ before the strain is applied in a drop-type fluidity test will be described later.

The aluminum alloy brazing sheet according to the third embodiment of the present invention is an aluminum alloy brazing sheet used for brazing of an aluminum material in an inert gas atmosphere or in vacuum and formed of a three-layer material in which a brazing material, a core material, and a sacrificial anode material are stacked in this order.

The core material is formed of an aluminum alloy and has a grain size of 20 to 300 μm, the aluminum alloy comprises Mn of 0.50 to 2.00 mass %, Mg of 0.40 to 2.00 mass %, Si of 1.50 mass % or less, and Fe of 1.00 mass % or less, with the balance being aluminum and inevitable impurities.

The brazing material is formed of an aluminum alloy comprising Si of 4.00 to 13.00 mass % with the balance being aluminum and inevitable impurities.

The sacrificial anode material is formed of aluminum or an aluminum alloy comprising Zn of 8.00 mass % or less with the balance being aluminum and inevitable impurities.

In a drop-type fluidity test, a ratio $\alpha$ ($\alpha=K_a/K_b$) of a fluid coefficient $K_a$ after a 5% strain is applied to a fluid coefficient $K_b$ before the strain is applied is 0.50 or more.

Aluminum Alloy Brazing Sheet According to Third Embodiment of Present Invention

An aluminum alloy brazing sheet according to the third embodiment of the present invention is formed of a three-layer material in which a brazing material, a core material, and a sacrificial anode material are stacked in this order. Specifically, the aluminum alloy brazing sheet according to the third embodiment of the present invention is a clad material in which the brazing material is cladded onto one side surface of the core material and the sacrificial anode material is cladded onto the other side surface of the core material.

The core material and the brazing material according to the aluminum alloy brazing sheet according to the third embodiment of the present invention are the same as the core material and the brazing material of the aluminum alloy brazing sheet according to the first embodiment of the present invention.

The sacrificial anode material of the aluminum alloy brazing sheet according to the third embodiment of the present invention is formed of aluminum or an aluminum alloy comprising Zn of 8.00 mass % or less with the balance being aluminum and inevitable impurities.

The purity of the aluminum of the sacrificial anode material is not particularly limited, but preferably 99.0 mass % or more and particularly preferably 99.5 mass % or more.

The aluminum alloy of the sacrificial anode material comprises Zn. Zn included in the sacrificial anode material has the effect of setting the potential lessnoble, and exhibits the sacrificial anticorrosion effect by forming a difference in potential between the sacrificial anode material and the core material. The Zn content in the sacrificial anode material is 8.00 mass % or less and preferably 3.00 mass % or less.

The aluminum alloy of the sacrificial anode material may comprise Mg. Mg included in the sacrificial anode material is diffused into the brazing material in brazing heating to break the aluminum oxide film covering the surface of the brazing material and improves the brazability, when the sacrificial anode material serves as the joining surface. The Mg content in the sacrificial anode material is 3.00 mass % or less and preferably 0.50 to 2.50 mass %. By contrast, when the Mg content in the sacrificial anode exceeds the range described above, a MgO oxide film is generated, and the brazability decreases.

The aluminum alloy of the sacrificial anode material may comprise one or two or more of Mn, Si, Fe, Cu, Ti, Zr, and Cr.

Mn, Si, Fe, Cu, Ti, Zr, and Cr included in the sacrificial anode material form intermetallic compounds to act as dispersion strengthening elements, or dissolved into the matrix to act as solid solution strengthening elements. When the sacrificial anode material comprises Mn, the Mn content in the sacrificial anode material is 2.00 mass % or less and preferably 0.30 to 1.50 mass %. When the sacrificial anode material comprises Si, the Si content in the sacrificial anode material is 1.50 mass % or less and preferably 0.20 to 1.00 mass %. When the sacrificial anode material comprises Fe, the Fe content in the sacrificial anode material is 1.00 mass % or less and preferably 0.05 to 0.70 mass %. When the sacrificial anode material comprises Cu, the Cu content in the sacrificial anode material is 1.00 mass % or less and preferably 0.01 to 0.30 mass %. When the sacrificial anode material comprises Ti, the Ti content in the sacrificial anode material is 0.30 mass % or less and preferably 0.10 to 0.20 mass %. When the sacrificial anode material comprises Zr, the Zr content in the sacrificial anode material is 0.30 mass % or less and preferably 0.10 to 0.20 mass %. When the sacrificial anode material comprises Cr, the Cr content in the sacrificial anode material is 0.30 mass % or less and preferably 0.10 to 0.20 mass %.

The sacrificial anode material may further comprise one or two of In and Sn. In and Sn in the sacrificial anode material have the effect of setting the natural potential of the material lessnoble, and exhibits the sacrificial anticorrosion effect. When the sacrificial anode material comprises In, the In content in the sacrificial anode material is 0.100 mass % or less, preferably 0.005 to 0.100 mass %, and particularly preferably 0.010 to 0.050 mass %. When the sacrificial anode material comprises Sn, the Sn content in the sacrificial anode material is 0.100 mass % or less, preferably 0.005 to 0.100 mass %, and particularly preferably 0.010 to 0.050 mass %.

The aluminum alloy brazing sheet according to the third embodiment of the present invention has a structure in which, in a drop-type fluidity test, a ratio $\alpha$ ($\alpha=K_a/K_b$) of a fluid coefficient $K_a$ after a 5% strain is applied to a fluid coefficient $K_b$ before the strain is applied is 0.50 or more and preferably 0.60 or more. Ina drop-type fluidity test, when the ratio $\alpha$ ($\alpha=K_a/K_b$) of a fluid coefficient $K_a$ after a 5% strain is applied to a fluid coefficient $K_b$ before the strain is applied falls within the range described above, erosion rarely occurs in brazing heating. By contrast, in a drop-type fluidity test, when the ratio $\alpha$ ($\alpha=K_a/K_b$) of a fluid coefficient $K_a$ after a 5% strain is applied to a fluid coefficient $K_b$ before the strain is applied is less than the range described above, erosion occurs in brazing heating. The method for measuring the ratio $\alpha$ ($\alpha=K_a/K_b$) of the fluid coefficient $K_a$ after a 5% strain is applied to the fluid coefficient $K_b$ before the strain is applied in a drop-type fluidity test will be described later.

The aluminum alloy brazing sheet according to the first embodiment of the present invention, the aluminum alloy brazing sheet according to the second embodiment of the present invention, and the aluminum alloy brazing sheet according to the third embodiment of the present invention are suitably used for brazing the aluminum material in an inert gas atmosphere, such as a nitrogen gas atmosphere, or in vacuum without using a flux. The aluminum alloy brazing sheet according to the first embodiment of the present invention, the aluminum alloy brazing sheet according to the second embodiment of the present invention, and the aluminum alloy brazing sheet according to the third embodiment of the present invention are used for tubes serving as channel forming materials through which the coolant or the like flow, and/or plates joined with the tubes to form the structures of heat exchangers. When the aluminum alloy brazing sheet according to the first embodiment of the present invention, the aluminum alloy brazing sheet according to the second embodiment of the present invention, or the aluminum alloy brazing sheet according to the third embodiment of the present invention is used for the tube material, the thickness of the brazing sheet is approximately 0.15 to 0.5 mm, and the clad ratio of the brazing material or the sacrificial anode material is generally approximately 5 to 30%. When the aluminum alloy brazing sheet according to the first embodiment of the present invention, the aluminum alloy brazing sheet according to the second embodiment of the present invention, or the aluminum alloy brazing sheet according to the third embodiment of the present invention is used for the plate material, the thickness of the brazing sheet is approximately 0.8 to 5 mm, and the clad ratio of the brazing material or the sacrificial anode material is generally approximately 5 to 30%.

When the core material of the aluminum alloy brazing sheet comprises Mg, the solidus temperature of the core material is low. In addition, when a strain is applied to the aluminum alloy brazing sheet before brazing heating, recrystallization occurs in brazing heating. Although the grain size becomes coarse, because subgrains remain and Si is infiltrated into the subgrain boundary of the subgrains, erosion easily occurs. For this reason, in the process of manufacturing the aluminum alloy brazing sheet, the processing ratio before final annealing is reduced to optimize the grain size of the material, and the heat input at and after hot working is increased to coarsen the fine Mn-based compound. In addition, Mg is precipitated to increase the recrystallization temperature and increase the recrystallization grain size in brazing heating, and generation of subgrains is suppressed. With this structure, erosion is suppressed. In addition, the inventors of the present invention have found that: (I) the aluminum alloy brazing sheet in which, in a drop-type fluidity test, a ratio $\alpha$ ($\alpha=K_a/K_b$) of a fluid coefficient K after a 5% strain is applied to a fluid coefficient $K_b$ before the strain is applied is 0.50 or more and preferably 0.60 or more is obtained, by setting the working ratio before final annealing to 20 to 70% in the manufacturing process of the aluminum alloy brazing sheet, specifically, by setting a working ratio (working ratio=$((t_a-t_b)/\times 100)$ of a thickness $t_b$ before the final annealing to a thickness $t_a$ after the last intermediate annealing among the intermediate annealings executed between passes of cold rolling in the cold working to 20 to 70%; and (M) in the aluminum alloy brazing sheet in which, in a drop-type fluidity test, a ratio $\alpha$ ($\alpha=K_a/K_b$) of a fluid coefficient $K_a$ after a 5% strain is applied to a fluid coefficient $K_b$ before the strain is applied is 0.50 or more and preferably 0.60 or more, erosion rarely occurs even when a strain is applied when the aluminum alloy brazing sheet is processed into a predetermined shape before brazing, that is, erosion in brazing heating is suppressed by setting, in a drop-type fluidity test, "a ratio $\alpha$ ($\alpha=K_a/K_b$) of a fluid coefficient $K_a$ after a 5% strain is applied to a fluid coefficient $K_b$ before the strain is applied" to 0.50 or more and preferably 0.60 or more.

Figure 2:
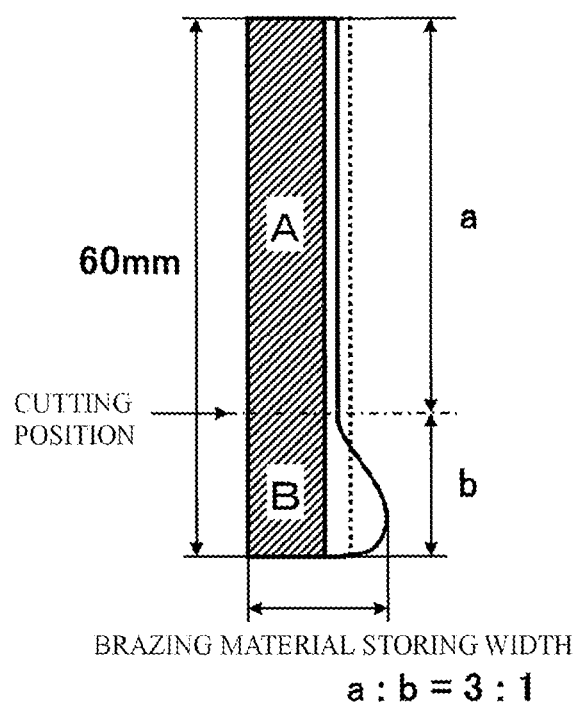
FIG. 2 is a diagram illustrating a state of an aluminum alloy brazing sheet according to a first embodiment of the present invention after heating in a drop-type fluidity test.

In the aluminum alloy brazing sheet according to the present invention, a ratio $\alpha$ ($\alpha=K_a/K_b$) of a fluid coefficient $K_a$ after a 5% strain is applied to a fluid coefficient $K_b$ before the strain is applied can be determined by the following process. Two aluminum alloy brazing sheets (before a strain is applied) serving as test materials are prepared, a 5% strain is applied to one of the sheets by cold rolling to prepare a test material provided with a 5% strain. Applying a 5% strain by cold rolling means that the test material is subjected to processing to reduce the thickness of the test material by a thickness corresponding to 5% of the thickness thereof at the time before the strain is applied. For example, when the thickness of the test material before the strain is applied is 0.5) mm, a strain in the case where processing is executed to reduce the thickness to 0.475 mm by cold rolling is 5%. Thereafter, fluid coefficients of the test materials are determined by a drop-type fluidity test using the test material before a strain is applied and the test material provided with the 5% strain. Each of the test materials is cut to a size of 40 mm (width)×60 mm (length), with the rolling direction serving as the longitudinal direction, and provided with two hanging holes 3 φ, and thereafter weight (W0) thereof is measured. Thereafter, the test materials are hung as illustrated in FIG. 2 (the aluminum alloy brazing sheet according to the first embodiment of the present invention), FIG. 3 (the aluminum alloy brazing sheet according to the second embodiment of the present invention), and FIG. 4 (the aluminum alloy brazing sheet according to the third embodiment of the present invention), heated to a maximum temperature of 600° C. with an average temperature increase speed of 20° C./min from the room temperature to 600° C. in a nitrogen gas furnace (oxygen concentration: 15 to 20 ppm), and maintained for three minutes at 600° C. After heating, as illustrated in FIG. 2 (the aluminum alloy brazing sheet according to the first embodiment of the present invention), FIG. 3 (the aluminum alloy brazing sheet according to the second embodiment of the present invention), and FIG. 4 (the aluminum alloy brazing sheet according to the third embodiment of the present invention), the brazing material storing portion (B) is cut to measure the weight (WB) thereof, and the fluid coefficient (K) is determined by:

$$K=(4WB-W0)/(3W0\times\text{clad ratio}) \quad (1)$$

The fluid coefficient ($K_b$) of the test material before the strain is applied and the fluid coefficient ($K_a$) after the 5% strain is applied are determined, and the ratio $\alpha$ ($\alpha=K_a/K_b$) of the fluid coefficient K after the 5% strain is applied to the fluid coefficient Kh before the strain is applied is calculated by:

$$\alpha=K_a/K_b \quad (2).$$

In the aluminum alloy brazing sheet according to the second embodiment of the present invention, when the brazing material 1 side and the brazing material 2 side have different fluid coefficients because of the difference in composition between the brazing material 1 and the brazing material 2, the fluid coefficient ratio $\alpha$ is determined as a mean value of the brazing material 1 side and the brazing material 2 side.

The following is an explanation of a method for manufacturing the aluminum alloy brazing sheet according to the present invention. The method for manufacturing the aluminum alloy brazing sheet according to the present invention is a method for manufacturing the aluminum alloy brazing sheet, by executing at least hot working, cold working, one or more intermediate annealings between rolling passes in the cold working, and final annealing after the last pass of the cold working on a stacked structure acquired by stacking a brazing material ingot and a core material ingot in this order to acquire the aluminum alloy brazing sheet in the method according to the first embodiment of the present invention, by stacking a brazing material ingot, a core material ingot, and a brazing material ingot in this order to acquire the aluminum alloy brazing sheet in the method according to the second embodiment of the present invention, and by stacking a brazing material ingot, a core material ingot, and a sacrificial anode material ingot in this order to acquire the aluminum alloy brazing sheet in the method according to the third embodiment of the present invention, wherein a working ratio (working ratio=$((t_a-t_b)/t_a)\times 100$) of a thickness $t_b$ before the final annealing to a thickness $t_a$ after the last intermediate annealing among the intermediate annealings is 20 to 7%.

Specifically, the method according to the first embodiment of the present invention, the method according to the second embodiment of the present invention, and the method according to the third embodiment of the present invention are the same except that the stacked structures subjected to hot rolling are different. In the following explanation, for the same points between the embodiments, the method according to the first embodiment of the present invention, the method according to the second embodiment of the present invention, and the method according to the third embodiment of the present invention are generally referred to as "method (for manufacturing the aluminum alloy brazing sheet) according to the present invention".

The method for manufacturing the aluminum alloy brazing sheet according to the present invention is a method for manufacturing the aluminum alloy brazing sheet, by executing at least hot working, cold working, one or more intermediate annealings between rolling passes in the cold working, and final annealing after the last pass of the cold working on a stacked structure acquired by stacking predetermined ingots in a predetermined order.

In the method for manufacturing the aluminum alloy brazing sheet according to the present invention, first, aluminum alloys having desired compositions used for the core material, the brazing material, and/or the sacrificial anode material are melted and casted to prepare a core material ingot, a brazing material ingot, and/or a sacrificial anode material ingot. The methods for melting and casting the aluminum alloys are not particularly limited, but ordinary methods are used.

Thereafter, the core material ingot, the brazing material ingot, and/or the sacrificial anode material ingot are homogenized, if necessary. The preferred temperature range of homogenization is 400 to 600° C., and the homogenization time is 2 to 20 hours.

Thereafter, the core material ingot, the brazing material ingot, and/or the sacrificial anode material ingot are faced to predetermined thicknesses, and the predetermined ingots are stacked in the predetermined order to acquire a stacked structure.

The core material ingot is formed of an aluminum alloy comprising Mn of 0.50 to 2.00 mass % and preferably 0.60 to 1.50 mass %, Mg of 0.40 to 2.00 mass %, preferably 0.50 to 1.50 mass %, and particularly preferably 0.70 to 1.10 mass %, Si of 1.50 mass % or less, preferably 0.05 to 1.50 mass %, and particularly preferably 0.20 to 1.00 mass %, and Fe of 1.00 mass % or less, preferably 0.05 to 1.00 mass %, and particularly preferably 0.05 to 0.70 mass %, with the balance being aluminum and inevitable impurities.

The core material ingot may further comprise one or two or more of Ti less than 0.10 mass %, Cu of 1.20 mass % or less and preferably 0.05 to 0.80 mass %, Zr of 0.30 mass % or less and preferably 0.10 to 0.20 mass %, and Cr of 0.30 mass % or less and preferably 0.10 to 0.20 mass %.

The brazing material ingot is formed of an aluminum alloy comprising Si of 4.00 to 13.00 mass % with the balance being aluminum and inevitable impurities.

The brazing material ingot may further comprise Bi of 1.00 mass % or less and preferably 0.004 to 0.50 mass %.

The brazing material ingot may further comprise one or two or more of Na of 0.050 mass % or less, preferably 0.003 to 0.050 mass %, and particularly preferably 0.005 to 0.030 mass %, and Sr of 0.050 mass % or less, preferably 0.003 to 0.050 mass %, and particularly preferably 0.005 to 0.030 mass %.

The brazing material ingot may further comprise Mg of 2.00 mass % or less and preferably 0.01 to 1.00 mass %.

The brazing material ingot may further comprise one or two of Zn of 8.00 mass % or less, preferably 0.50 to 8.00 mass %, and particularly preferably 2.00 to 4.00 mass %, and Cu of 4.00 mass % or less and preferably 1.00 to 3.00 mass %.

The brazing material ingot may further comprise one or two of in of 0.100 mass % or less, preferably 0.005 to 0.100 mass %, and particularly preferably 0.010 to 0.050 mass %, and Sn of 0.100 mass % or less, preferably 0.005 to 0.100 mass %, and particularly preferably 0.010 to 0.050 mass %.

The brazing material ingot may further comprise Fe of 1.00 mass % or less and preferably 0.05 to 0.50 mass %.

The sacrificial anode material ingot is formed of aluminum or an aluminum alloy comprising Zn of 8.00 mass % or less and preferably 3.00 mass % or less, with the balance being aluminum and inevitable impurities.

The sacrificial anode material ingot may further comprise Mg of 3.00 mass % or less and preferably 0.50 to 2.50 mass %.

The sacrificial anode material ingot may further comprise one or two or more of Mn of 2.00 mass % or less and preferably 0.30 to 1.50 mass %, Si of 1.50 mass % or less and preferably 0.20 to 1.00 mass %, Fe of 1.00 mass % or less and preferably 0.05 to 0.70 mass %, Cu of 1.00 mass % or less and preferably 0.01 to 0.30 mass %, Ti of 0.30 mass % or less and preferably 0.10 to 0.20 mass %, Zr of 0.30 mass % or less and preferably 0.10 to 0.20 mass %, and Cr of 0.30 mass % or less and preferably 0.10 to 0.20 mass %.

The sacrificial anode material ingot may further comprise one or two of In of 0.100 mass % or less, preferably 0.005 to 0.100 mass %, and particularly preferably 0.010 to 0.050 mass %, and Sn of 0.100 mass % or less, preferably 0.005 to 0.100 mass %, and particularly preferably 0.010 to 0.050 mass %.

In the hot working, the stacked structure acquired by stacking predetermined ingots in the predetermined order is subjected to hot rolling at 400 to 550° C. In hot rolling, the stacked structure is rolled to a thickness of, for example, 2 to 8 mm.

In the cold working, the hot-rolled structure acquired by executing hot working is subjected to cold rolling. In the cold working, cold rolling is executed with a plurality of passes.

In the cold working, one or two or more times of intermediate annealing are executed between passes of cold rolling. The temperature of the intermediate annealing is 200 to 500° C. and preferably 250 to 400° C. In the intermediate annealing, the temperature is increased to the intermediate annealing temperature, and cooling may be promptly started after the temperature reaches the intermediate annealing temperature, or cooling may be started after the structure is maintained for certain time at the intermediate annealing temperature after the temperature reaches the intermediate annealing temperature. The time for which the temperature is maintained at the intermediate annealing temperature is 0 to 10 hours and preferably 1 to 5 hours.

After cold rolling, the cold-rolled structure acquired by cold working is subjected to final annealing to anneal the cold-rolled structure at 300 to 500° C. and preferably 350 to 450° C. In the final annealing, the temperature is increased to the final annealing temperature, and cooling may be promptly started after the temperature reaches the final annealing temperature, or cooling may be started after the structure is maintained for certain time at the final annealing temperature after the temperature reaches the final annealing temperature. The time for which the temperature is maintained at the final annealing temperature is 0 to 10 hours and preferably 1 to 5 hours.

In addition, in the method for manufacturing the aluminum alloy clad material according to the present invention, a working ratio (working ratio=$((t_a-t_b)/t_a)\times100$) of a thickness $t_b$ before the final annealing to a thickness $t_a$ after the last intermediate annealing among the intermediate annealings is 20 to 70%. Specifically, in the method for manufacturing the aluminum alloy clad material according to the present invention, after the last intermediate annealing is executed, cold working is executed such that the working ratio (working ratio=$((t_a-t_b)/t_a)\times100$) is set to 20 to 70% in cold rolling before the final annealing. By setting the working ratio (working ratio=$((t_a-t_b)/t_a)\times100$) of a thickness t b before the final annealing to a thickness $t_a$ after the last intermediate annealing to 20 to 70%, the grain size of the core material is adjusted to 20 to 300 μm and preferably 50 to 200 μm.

In the method for manufacturing the aluminum alloy clad material according to the present invention, to coarsen the grains of the core material, it is preferable that the time for which the structure is maintained at 300° C. or more is three hours or more, the time for which the structure is maintained at 340° C. or more is one hour or more, and the cooling speed is 300° C./hour or less, in the intermediate annealings.

In the method for manufacturing the aluminum alloy clad material according to the present invention, to coarsen the grains of the core material, it is preferable that the time for which the structure is maintained at 300° C. or more is three hours or more, the time for which the structure is maintained at 340° C. or more is one hour or more, and the cooling speed is 300° C./hour or less, in the final annealing.

The aluminum alloy clad material of the present invention is acquired by executing the method for manufacturing the aluminum alloy clad material according to the present invention as described above.

An example will be illustrated hereinafter to specifically explain the present invention, but the present invention is not limited to the example illustrated hereinafter.

EXAMPLE

By continuous casting, the brazing material ingots, the sacrificial anode material ingots, and the core material ingots having the chemical compositions illustrated in Table 1 are prepared. Thereafter, the core material ingots are homogenized and thereafter subjected to facing to reduce the thickness of the core material ingots to a predetermined thickness. Thereafter, the brazing material ingots and the sacrificial anode material ingots are subjected to hot rolling to set the thicknesses of the brazing material ingots and the sacrificial anode material ingots to predetermined thicknesses. The brazing material ingots, the sacrificial anode material ingots, and the core material ingots acquired as described above are superimposed with combinations as illustrated in Table 1 to prepare stacked structures. Each of the acquired stacked structures is hot-rolled to join the core material ingot and the brazing material ingot or the sacrificial anode material ingot and prepare a clad material having a thickness of 3.0 mm. Each of the acquired clad materials was subjected to cold rolling, intermediate annealing, cold rolling, and final annealing in this order to acquire a test material having a thickness of 0.5 mm. The intermediate annealing and the final annealing were executed at a retaining temperature of 400° C. and with the retaining time of three hours. Table 2 illustrates the working ratio (working ratio=$((t_a-t_b)/t_a)\times100$) from a thickness $(t_a)$ after the intermediate annealing to a thickness $(t_b)$ before the final annealing and the annealing conditions. In the cooling speed serving as the annealing condition, A denotes the speed "50° C./hour or more and less than 150° C./hour", B denotes the speed "150° C./hour or more and 300° C./hour or less", and X denotes the speed exceeding 300° C./hour.

<Measurement of Grain Size>

The cross section (L-LT face) of each of the prepared test materials is subjected to mirror polishing to execute surface shaping, thereafter, subjected to barker etching, and a photomicrograph is taken. In the photomicrograph, a line segment parallel with an interface between the brazing material and the core material was drawn on the core material, the number of grains cut with the line segment was counted, and the grain size of the core material was calculated with the calculation formula "grain size (μm)=(length of line segment (mm)×1000))/(number of cut grains×photograph magnifications)". Suppose that the number of grains at the end portion of the line segment is 0.5. Table 2 illustrates the grain size of the core material. In Table 2, X denotes the grain size exceeding 300 μm, A denotes the grain size equal to or less than 300 μm and equal to or more than 100 μm, B denotes the grain size less than 100 μm and equal to or more than 20 μm, and Y denotes the grain size less than 20 μm.

<Evaluation of Brazability>

The test material having a size of 50 mm×50 mm and subjected to only degreasing with acetone (not etched), the test material subjected to degreasing with acetone and thereafter etched with weak acid (etched), and a 3003 alloy plate material having a thickness of 0.1 mm, subjected to corrugating, and thereafter degreased were prepared, and mounted on the miniature core illustrated in FIG. 1.

Thereafter, brazing heating was executed in a nitrogen gas furnace. The nitrogen gas furnace is a batch-type experimental furnace. The oxygen concentration in brazing was set to 15 to 20 ppm. The maximum temperature of each of the test pieces was set to 600° C.

Thereafter, the corrugated fin was cut off from the miniature core after brazing. Thereafter, the lengths of the traces of the fillets existing on each plate were measured in the width direction of the plate, and the sum of them was calculated. Apart from it, the sum of lengths of the fillets in the width direction in the case where it is supposed that the plate and the corrugated fin were entirely joined is calculated. In addition, the ratio of the former value to the latter value is regarded as the joining ratio (%) of the corrugated fin in each test member. The latter value can be calculated by, for example, multiplying the width of the corrugated fin by the number of top portions of the corrugated fin. The joining ratio was calculated for each of the upper test material and the lower test material.

The test material of 0.5 mm acquired by the above process and the test material (5% strain) acquired by rolling the test material acquired by the above processing and having a thickness of 0.5 mm to a thickness of 0.475 mm by cold rolling were subjected to a drop-type fluidity test to determine the fluid coefficients of them.

Figure 3:
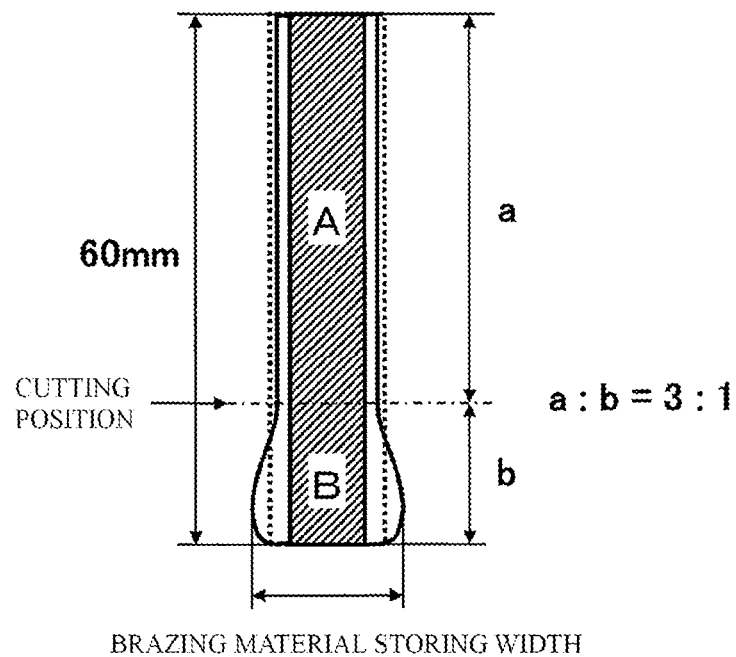
FIG. 3 is a diagram illustrating a state of an aluminum alloy brazing sheet according to a second embodiment of the present invention after heating in a drop-type fluidity test.
Figure 4:
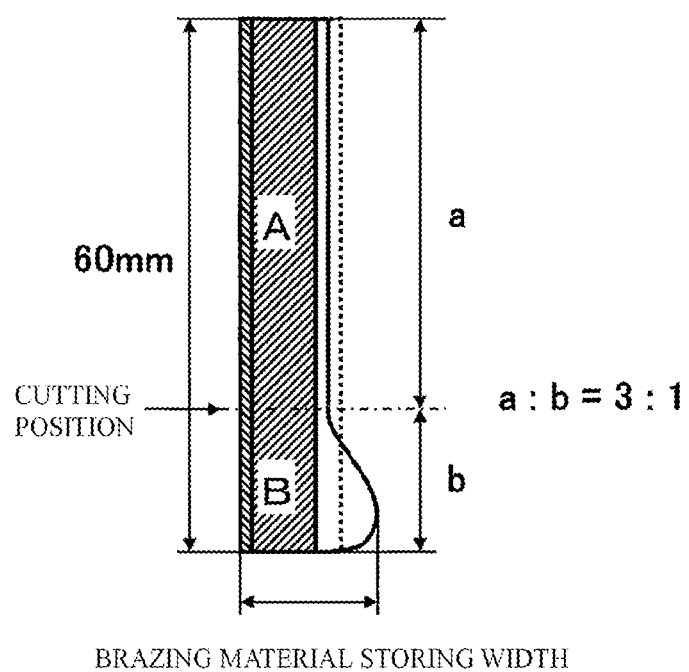
FIG. 4 is a diagram illustrating a state of an aluminum alloy brazing sheet according to a third embodiment of the present invention after heating in a drop-type fluidity test.

First, each of the test materials was cut to a size of 40 mm (width)×60 mm (length), with the rolling direction serving as the longitudinal direction, and provided with two hanging holes 3φ, and thereafter weight (W0) thereof is measured. Thereafter, the test materials were hung as illustrated in FIG. 2, FIG. 3, or FIG. 4, heated to a maximum temperature of 600° C. with an average temperature increase speed of 20° C./min from the room temperature to 600° C. in a nitrogen gas furnace, and maintained for three minutes at 600° C. After the heating test, the brazing material storing portion (B) was cut to measure the weight (WB) thereof, and the fluid coefficient (K) was determined by:

$$K=(4WB-W0)/(3W0 \times \text{clad ratio}) \quad (1).$$

Thereafter, the ratio $\alpha$ of the fluid coefficient $K_a$ after the 5% strain was applied to the fluid coefficient $K_a$ before the strain was applied was calculated by:

$$\alpha = K_a/K_b \quad (2).$$

Table 2 illustrates the value of $\alpha$. In Table 2, A denotes $\alpha$ having the value of 0.70 or more, B denotes $\alpha$ having the value less than 0.70 and equal to or more than 0.50, and X denotes $\alpha$ having the value less than 0.50.

In the item "brazing results of miniature core test materials" in Table 1, "good" denotes the case where both joining ratio of the upper test material and joining ratio of the lower test material were 80% or more, and "fail" denotes the case where the joining ratios were less than 80%, as a result of executing brazing for the miniature core test materials. In evaluation of brazability of the present example, the case where the average of the joining ratios is 80% or more is determined as an acceptable material because it has excellent brazability. In addition, the case where the average of the joining ratios is less than 80% is determined as a non-acceptable material because it has poor brazability.

TABLE 1

| | TEST MATERIAL NO. | CLAD STRUCTURE | CHEMICAL COMPOSITION (mass %) | | | | | | | | | | | CLAD RATIO (%) |
|---|---|---|---|---|---|---|---|---|---|---|---|---|---|---|
| | | | Si | Fe | Cu | Mn | Mg | Cr | Zn | Ti | Zr | Bi | OTHERS | |
| INVENTION EXAMPLE | 1 | BM 1 | 10.20 | 0.20 | — | — | — | — | — | — | — | — | — | 10 |
| | | CM | 0.20 | 0.20 | — | 0.80 | 0.80 | — | — | — | — | — | — | — |
| | | BM 2 | 10.20 | 0.20 | — | — | — | — | — | — | — | — | — | 10 |
| | 2 | BM 1 | 5.00 | — | — | — | — | — | — | — | — | 0.10 | — | 10 |
| | | CM | 0.10 | 0.10 | — | 1.00 | 0.80 | — | — | 0.05 | — | — | — | — |
| | | BM 2 | 5.00 | — | — | — | — | — | — | — | — | 0.10 | — | 10 |
| | 3 | BM 1 | 12.50 | — | — | — | — | — | — | — | — | 0.02 | — | 10 |
| | | CM | 0.20 | 0.20 | — | 1.00 | 0.80 | — | — | — | — | — | — | — |
| | | BM 2 | 12.50 | — | — | — | — | — | — | — | — | 0.02 | — | 10 |
| | 4 | BM 1 | 10.20 | 0.20 | 2.00 | — | — | — | 5.00 | — | — | — | — | 10 |
| | | CM | 0.20 | 0.20 | — | 1.00 | 0.80 | — | — | — | — | — | — | — |
| | | BM 2 | 10.20 | 0.20 | 2.00 | — | — | — | 5.00 | — | — | — | — | 10 |
| | 5 | BM 1 | 10.20 | 0.20 | — | — | — | — | — | — | — | 0.10 | — | 10 |
| | | CM | 0.20 | 0.20 | 0.15 | 1.20 | 1.20 | — | — | — | — | — | — | — |
| | | BM 2 | 10.20 | 0.20 | — | — | — | — | — | — | — | 0.10 | — | 10 |
| | 6 | BM 1 | 10.20 | 0.20 | — | — | — | — | — | — | — | 0.30 | — | 10 |
| | | CM | 0.20 | 0.20 | — | 0.60 | 1.70 | — | — | — | — | — | — | — |
| | | BM 2 | 10.20 | 0.20 | — | — | — | — | — | — | — | 0.30 | — | 10 |
| | 7 | BM 1 | 10.20 | 0.20 | — | — | 1.00 | — | — | — | — | 0.30 | In: 0.02 | 10 |
| | | CM | 0.20 | 0.20 | 1.00 | 1.00 | 0.50 | — | — | — | — | — | — | — |
| | | BM 2 | 10.20 | 0.20 | — | — | 1.00 | — | — | — | — | 0.30 | In: 0.02 | 10 |
| | 8 | BM 1 | 10.20 | 0.20 | — | — | 0.10 | — | — | — | — | 0.20 | Sn: 0.02 | 10 |
| | | CM | 0.20 | 0.70 | 0.20 | 1.00 | 0.50 | — | — | — | — | — | — | — |
| | | BM 2 | 10.20 | 0.20 | — | — | 0.10 | — | — | — | — | 0.20 | Sn: 0.02 | 10 |
| | 9 | BM 1 | 10.20 | 0.20 | — | — | 1.80 | — | — | — | — | 0.10 | — | 10 |
| | | CM | 0.20 | 0.20 | 0.15 | 1.20 | 0.80 | 0.10 | — | — | 0.10 | — | — | — |
| | | BM 2 | 10.20 | 0.20 | — | — | 1.80 | — | — | — | — | 0.10 | — | 10 |
| | 10 | BM 1 | 10.20 | 0.20 | — | — | — | — | — | — | — | 0.10 | Sr: 0.02 | 10 |
| | | CM | 1.00 | 0.50 | — | 1.70 | 0.50 | — | — | — | — | — | — | — |
| | | BM 2 | 10.20 | 0.20 | — | — | — | — | — | — | — | 0.10 | Sr: 0.02 | 10 |
| | 11 | BM 1 | 12.50 | — | — | — | — | — | — | — | — | 0.02 | Na: 0.01 | 10 |
| | | CM | 0.20 | 0.20 | — | 1.00 | 0.80 | — | — | — | — | — | — | — |
| | | BM 2 | 12.50 | — | — | — | — | — | — | — | — | 0.02 | Na: 0.01 | 10 |
| | 12 | BM 1 | 12.50 | — | — | — | — | — | — | — | — | 0.02 | — | 10 |
| | | CM | 0.20 | 0.20 | — | 1.00 | 0.80 | — | — | — | — | — | — | — |
| | | BM 2 | 12.50 | — | — | — | — | — | — | — | — | 0.02 | — | 10 |
| | 13 | BM 1 | 10.20 | 0.20 | — | — | — | — | — | — | — | 0.10 | — | 10 |
| | | CM | 0.20 | 0.20 | — | 1.00 | 0.80 | — | — | — | — | — | — | — |
| | | BM 2 | 12.50 | — | — | — | — | — | — | — | — | 0.02 | — | 10 |
| | 14 | BM | 12.50 | — | — | — | — | — | — | — | — | 0.02 | — | 10 |
| | | CM | 0.20 | 0.20 | — | 1.00 | 0.80 | — | — | — | — | — | — | — |
| | 15 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 0.20 | 0.20 | — | — | — | — | — | — | — | — | — | 10 |
| | 16 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 0.30 | 0.30 | — | — | — | — | 2.00 | — | — | — | — | 10 |
| | 17 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 0.30 | 0.30 | — | — | — | 0.50 | — | — | — | — | In: 0.02 | 10 |
| | 18 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 0.50 | 0.50 | — | — | 2.50 | — | 4.00 | — | — | — | Sn: 0.02 | 10 |
| | 19 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 0.70 | 0.70 | 0.10 | 1.50 | 0.50 | — | 1.00 | 0.10 | — | — | — | 10 |

TABLE 1-continued

| TEST MATERIAL NO. | | CLAD STRUCTURE | CHEMICAL COMPOSITION (mass %) | | | | | | | | | | | CLAD RATIO (%) |
|---|---|---|---|---|---|---|---|---|---|---|---|---|---|---|
| | | | Si | Fe | Cu | Mn | Mg | Cr | Zn | Ti | Zr | Bi | OTHERS | |
| COMPARATIVE EXAMPLE | 20 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 0.50 | 1.00 | 0.50 | — | — | 0.10 | 5.00 | — | — | — | — | 10 |
| | 21 | BM | 12.50 | — | — | — | — | — | — | — | — | 0.02 | — | 10 |
| | | CM | 0.20 | 0.20 | — | 1.00 | 0.80 | — | — | — | — | — | — | — |
| | | SAM | 1.00 | 0.30 | 0.30 | — | 0.10 | — | 3.00 | — | 0.10 | — | — | 10 |
| | R1 | BM 1 | 10.20 | 0.20 | — | — | — | — | — | — | — | 0.10 | — | 10 |
| | | CM | 0.20 | 0.20 | — | 1.00 | 0.20 | — | — | — | — | — | — | — |
| | | BM 2 | 10.20 | 0.20 | — | — | — | — | — | — | — | 0.10 | — | 10 |
| | R2 | BM 1 | 10.20 | 0.20 | — | — | — | — | — | — | — | 0.10 | — | 10 |
| | | CM | 0.20 | 0.20 | — | 1.00 | 1.20 | — | — | — | — | — | — | — |
| | | BM 2 | 10.20 | 0.20 | — | — | — | — | — | — | — | 0.10 | — | 10 |
| | R3 | BM 1 | 10.20 | 0.20 | — | — | — | — | — | — | — | 0.10 | — | 10 |
| | | CM | 0.20 | 0.20 | — | 1.00 | 1.20 | — | — | — | — | — | — | — |
| | | BM 2 | 10.20 | 0.20 | — | — | — | — | — | — | — | 0.10 | — | 10 |
| | R4 | BM 1 | 3.00 | 0.20 | — | — | — | — | — | — | — | 0.10 | — | 10 |
| | | CM | 0.20 | 0.20 | — | 1.00 | 1.20 | — | — | — | — | — | — | — |
| | | BM 2 | 3.00 | 0.20 | — | — | — | — | — | — | — | 0.10 | — | 10 |

BM: brazing material
CM: core material
SAM: sacrificial anode material

TABLE 2

| | TEST MATE-RIAL NO | CLAD STRUC-TURE | ROLLING RATIO FROM INTER-MEDIATE ANNEALING THICKNESS TO FINAL THICKNESS (%) | INTERMEDIATE ANNEALING AND FINAL ANNEALING CONDITIONS | | | GRAIN SIZE OF CORE MATE-RIAL | BRAZING RESULTS OF MINIATURE CORE TEST MATERIALS | | FLUID COEF-FICIENT RATIO α |
|---|---|---|---|---|---|---|---|---|---|---|
| | | | | TIME FOR WHICH STRUCTURE IS MAINTAINED AT 300° C. OR MORE (h) | TIME FOR WHICH STRUCTURE IS MAINTAINED AT 340° C. OR MORE (b) | COOL-ING SPEED | | NOT ETCHED | ETCHED | |
| INVENTION EXAMPLE | 1 | BM 1 CM BM 2 | 50 | 8 | 3 | B | A | good | good | A |
| | 2 | BM 1 CM BM 2 | 50 | 3.5 | 1.5 | B | A | good | good | B |
| | 3 | BM 1 CM BM 2 | 50 | 10 | 6 | A | A | good | good | A |
| | 4 | BM 1 CM BM 2 | 50 | 8 | 4 | A | A | good | good | A |
| | 5 | BM 1 CM BM 2 | 50 | 8 | 4 | A | A | good | good | B |
| | 6 | BM 1 CM BM 2 | 50 | 8 | 4 | A | B | good | good | B |
| | 7 | BM 1 CM BM 2 | 50 | 15 | 8 | A | A | good | good | A |
| | 8 | BM 1 CM BM 2 | 50 | 8 | 4 | A | A | good | good | A |
| | 9 | BM 1 CM BM 2 | 50 | 8 | 4 | A | A | good | good | A |
| | 10 | BM 1 CM BM 2 | 50 | 8 | 4 | A | B | good | good | B |
| | 11 | BM 1 CM BM 2 | 20 | 8 | 4 | A | A | good | good | A |

TABLE 2-continued

| | TEST MATE-RIAL NO | CLAD STRUC-TURE | ROLLING RATIO FROM INTER-MEDIATE ANNEALING THICKNESS TO FINAL THICKNESS (%) | INTERMEDIATE ANNEALING AND FINAL ANNEALING CONDITIONS | | COOL-ING SPEED | GRAIN SIZE OF CORE MATE-RIAL | BRAZING RESULTS OF MINIATURE CORE TEST MATERIALS | | FLUID COEF-FICIENT RATIO α |
|---|---|---|---|---|---|---|---|---|---|---|
| | | | | TIME FOR WHICH STRUCTURE IS MAINTAINED AT 300° C. OR MORE (h) | TIME FOR WHICH STRUCTURE IS MAINTAINED AT 340° C. OR MORE (b) | | | NOT ETCHED | ETCHED | |
| INVENTION EXAMPLE | 12 | BM 1 CM BM 2 | 70 | 8 | 4 | A | B | good | good | B |
| | 13 | BM 1 CM BM 2 | 50 | 8 | 4 | A | A | good | good | A |
| | 14 | BM CM | 50 | 10 | 6 | A | A | good | good | A |
| | 15 | BM CM SAM | 50 | 10 | 6 | A | A | good | good | A |
| | 16 | BM CM SAM | 50 | 10 | 6 | A | A | good | good | A |
| | 17 | BM CM SAM | 50 | 10 | 6 | A | A | good | good | A |
| | 18 | BM CM SAM | 50 | 10 | 6 | A | A | good | good | A |
| | 19 | BM CM SAM | 50 | 10 | 6 | A | A | good | good | A |
| | 20 | BM CM SAM | 50 | 10 | 6 | A | A | good | good | A |
| | 21 | BM CM SAM | 50 | 10 | 6 | A | A | good | good | A |
| COMPARATIVE EXAMPLE | R1 | BM 1 CM BM 2 | 50 | 10 | 6 | A | A | fail | fail | A |
| | R2 | BM 1 CM BM 2 | 90 | 8 | 4 | A | X | good | good | X |
| | R3 | BM 1 CM BM 2 | 60 | 2.5 | 0.5 | X | X | good | good | X |
| | R4 | BM 1 CM BM 2 | 50 | 8 | 4 | A | A | fail | fail | B |

BM: brazing material
CM: core material
SAM: sacrificial anode material

As illustrated in Table 1 and Table 2, it has been verified that the test materials serving as examples of the present invention acquire the excellent joining state at the acceptable level and the fluid coefficient ratio α of 0.50 or more.

The invention claimed is:

1. An aluminum alloy brazing sheet used for brazing of an aluminum alloy in an inert gas atmosphere or in vacuum and formed of a two-layer material in which a brazing material and a core material are stacked in this order,
the core material being formed of an aluminum alloy and having a grain size of 20 to 300 µm, the aluminum alloy comprising Mn of 0.50 to 2.00 mass %, Mg of 0.40 to 2.00 mass %, Si of 0.05 to 1.50 mass %, and Fe of 0.05 to 1.00 mass %, and optionally one or two or more of Ti less than 0.10 mass %, Cu of 1.20 mass % or less, Zr of 0.30 mass % or less, and Cr of 0.30 mass % or less, with the balance being aluminum and inevitable impurities,
the brazing material being formed of an aluminum alloy comprising Si of 4.00 to 13.00 mass %, and optionally one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less, with the balance being aluminum and inevitable impurities, and
in a drop-type fluidity test, a ratio $\alpha(\alpha=K_a/K_b)$ of a fluid coefficient $K_a$ after a 5% strain is applied to a fluid coefficient $K_b$ before the strain is applied being 0.50 or more.

2. An aluminum alloy brazing sheet used for brazing of an aluminum material in an inert gas atmosphere or in vacuum and formed of a three-layer material in which a brazing material, a core material, and a brazing material are stacked in this order, the core material being formed of an aluminum alloy and having a grain size of 20 to 300 μm, the aluminum alloy comprising Mn of 0.50 to 2.00 mass %, Mg of 0.40 to 2.00 mass %, Si of 0.05 to 1.50 mass %, and Fe of 0.05 to 1.00 mass %, and optionally one or two or more of Ti less than 0.10 mass %, Cu of 1.20 mass % or less, Zr of 0.30 mass % or less, and Cr of 0.30 mass % or less, with the balance being aluminum and inevitable impurities, each of the brazing materials being formed of an aluminum alloy comprising Si of 4.00 to 13.00 mass %, and optionally one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less, with the balance being aluminum and inevitable impurities, and in a drop-type fluidity test, a ratio $\alpha(\alpha=K_a/K_b)$ of a fluid coefficient $K_a$ after a 5% strain is applied to a fluid coefficient $K_b$ before the strain is applied being 0.50 or more.

3. An aluminum alloy brazing sheet used for brazing of an aluminum material in an inert gas atmosphere or in vacuum and formed of a three-layer material in which a brazing material, a core material, and a sacrificial anode material are stacked in this order, the core material being formed of an aluminum alloy and having a grain size of 20 to 300 μm, the aluminum alloy comprising Mn of 0.50 to 2.00 mass %, Mg of 0.40 to 2.00 mass %, Si of 0.05 to 1.50 mass %, and Fe of 0.05 to 1.00 mass %, and optionally one or two or more of Ti less than 0.10 mass %, Cu of 1.20 mass % or less, Zr of 0.30 mass % or less, and Cr of 0.30 mass % or less, with the balance being aluminum and inevitable impurities, the brazing material being formed of an aluminum alloy comprising Si of 4.00 to 13.00 mass %, and optionally one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less, with the balance being aluminum and inevitable impurities, the sacrificial anode material being formed of aluminum or an aluminum alloy, the aluminum alloy optionally comprising one or two or more of Zn of 8.00 mass % or less, Mn of 2.00 mass % or less, Mg of 3.00 mass % or less, Si of 1.50 mass % or less, Fe of 1.00 mass % or less, Cu of 1.00 mass % or less, Ti of 0.30 mass % or less, Zr of 0.30 mass % or less, Cr of 0.30 mass % or less, In of 0.100 mass % or less, and Sn of 0.100 mass % or less, with the balance being aluminum and inevitable impurities, and in a drop-type fluidity test, a ratio $\alpha(\alpha=K_a/K_b)$ of a fluid coefficient $K_a$ after a 5% strain is applied to a fluid coefficient $K_b$ before the strain is applied being 0.50 or more.

4. A method for manufacturing the aluminum alloy brazing sheet according to claim 1, the method comprising executing at least hot working, cold working, one or more intermediate annealings between rolling passes in the cold working, and final annealing after a last pass of the cold working on a stacked structure acquired by stacking a brazing material ingot and a core material ingot in this order to acquire the aluminum alloy brazing sheet, wherein the core material ingot is formed of an aluminum alloy comprising Mn of 0.50 to 2.00 mass %, Mg of 0.40 to 2.00 mass %, Si of 0.05 to 1.50 mass %, and Fe of 0.05 to 1.00 mass %, and optionally one or two or more of Ti less than 0.10 mass %, Cu of 1.20 mass % or less, Zr of 0.30 mass % or less, and Cr of 0.30 mass % or less, with the balance being aluminum and inevitable impurities, the brazing material ingot is formed of an aluminum alloy comprising Si of 4.00 to 13.00 mass %, and optionally one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less, with the balance being aluminum and inevitable impurities, and a working ratio (working ratio=$((t_a-t_b)/t_a)\times100$) of a thickness $t_b$ before the final annealing to a thickness $t_a$ after last intermediate annealing among the intermediate annealings is 20 to 70%.

5. A method for manufacturing the aluminum alloy brazing sheet according to claim 2, the method comprising executing at least hot working, cold working, one or more intermediate annealings between rolling passes in the cold working, and final annealing after a last pass of the cold working on a stacked structure acquired by stacking a brazing material ingot, a core material ingot, and a brazing material ingot in this order to acquire the aluminum alloy brazing sheet, wherein the core material ingot is formed of an aluminum alloy comprising Mn of 0.50 to 2.00 mass %, Mg of 0.40 to 2.00 mass %, Si of 0.05 to 1.50 mass %, and Fe of 0.05 to 1.00 mass %, and optionally one or two or more of Ti less than 0.10 mass %, Cu of 1.20 mass % or less, Zr of 0.30 mass % or less, and Cr of 0.30 mass % or less, with the balance being aluminum and inevitable impurities, each of the brazing material ingots is formed of an aluminum alloy comprising Si of 4.00 to 13.00 mass %, and optionally one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less, with the balance being aluminum and inevitable impurities, and a working ratio (working ratio=$((t_a-t_b)/t_a)\times100$) of a thickness $t_b$ before the final annealing to a thickness $t_a$ after last intermediate annealing among the intermediate annealings is 20 to 70%.

6. A method for manufacturing the aluminum alloy brazing sheet according to claim 3, the method comprising executing at least hot working, cold working, one or more intermediate annealings between rolling passes in the cold working, and final annealing after a last pass of the cold working on a stacked structure acquired by stacking a brazing material ingot, a core material ingot, and a sacrificial anode material ingot in this order to acquire the aluminum alloy brazing sheet, wherein the core material ingot is formed of an aluminum alloy comprising Mn of 0.50 to 2.00 mass %, Mg of 0.40 to 2.00 mass %, Si of 0.05 to 1.50 mass %, and Fe of 0.05 to 1.00 mass %, and optionally one or two or more of Ti less than 0.10 mass %, Cu of 1.20 mass % or less, Zr of 0.30 mass % or less, and Cr of 0.30 mass % or less, with the balance being aluminum and inevitable impurities, the brazing material ingot is formed of an aluminum alloy comprising Si of 4.00 to 13.00 mass %, and optionally one or two or more of Bi of 1.00 mass % or less, Na of 0.050 mass % or less, Sr of 0.050 mass % or less, Mg of 2.00 mass % or less, Zn of 8.00 mass % or less, Cu of 4.00 mass % or less, In of 0.100 mass % or less, Sn of 0.100 mass % or less, and Fe of 1.00 mass % or less, with the balance being aluminum and inevitable impurities, the sacrificial anode material ingot is formed of aluminum or an aluminum alloy, the aluminum alloy optionally comprising one or two or more of Zn of 8.00 mass % or less, Mn of 2.00 mass % or less, Mg of 3.00 mass % or less, Si of 1.50 mass % or less, Fe of 1.00 mass % or less, Cu of 1.00 mass % or less, Ti of 0.30 mass % or less, Zr of 0.30 mass % or less, Cr of 0.30 mass % or less, In of 0.100 mass % or less, and Sn of 0.100 mass % or less, with the balance being aluminum and inevitable impurities, and a working ratio (working ratio=$((t_a-t_b)/t_b \times 100)$) of a thickness $t_b$ before the final annealing to a thickness $t_a$ after last intermediate annealing among the intermediate annealings is 20 to 70%.

7. The method for manufacturing the aluminum alloy brazing sheet according to claim 4, wherein a time for which the structure is maintained at 300° C. or more is three hours or more, a time for which the structure is maintained at 340° C. or more is one hour or more, and cooling speed is 300° C./hour or less in the intermediate annealings.

8. The method for manufacturing the aluminum alloy brazing sheet according to claim 4, wherein a time for which the structure is maintained at 300° C. or more is three hours or more, a time for which the structure is maintained at 340° C. or more is one hour or more, and cooling speed is 300° C./hour or less in the final annealing.

9. The method for manufacturing the aluminum alloy brazing sheet according to claim 5, wherein a time for which the structure is maintained at 300° C. or more is three hours or more, a time for which the structure is maintained at 340° C. or more is one hour or more, and cooling speed is 300° C./hour or less in the intermediate annealings.

10. The method for manufacturing the aluminum alloy brazing sheet according to claim 6, wherein a time for which the structure is maintained at 300° C. or more is three hours or more, a time for which the structure is maintained at 340° C. or more is one hour or more, and cooling speed is 300° C./hour or less in the intermediate annealings.

11. The method for manufacturing the aluminum alloy brazing sheet according to claim 5, wherein a time for which the structure is maintained at 300° C. or more is three hours or more, a time for which the structure is maintained at 340° C. or more is one hour or more, and cooling speed is 300° C./hour or less in the final annealing.

12. The method for manufacturing the aluminum alloy brazing sheet according to claim 6, wherein a time for which the structure is maintained at 300° C. or more is three hours or more, a time for which the structure is maintained at 340° C. or more is one hour or more, and cooling speed is 300° C./hour or less in the final annealing.

13. The method for manufacturing the aluminum alloy brazing sheet according to claim 7, wherein a time for which the structure is maintained at 300° C. or more is three hours or more, a time for which the structure is maintained at 340° C. or more is one hour or more, and cooling speed is 300° C./hour or less in the final annealing.

14. The method for manufacturing the aluminum alloy brazing sheet according to claim 9, wherein a time for which the structure is maintained at 300° C. or more is three hours or more, a time for which the structure is maintained at 340° C. or more is one hour or more, and cooling speed is 300° C./hour or less in the final annealing.

15. The method for manufacturing the aluminum alloy brazing sheet according to claim 10, wherein a time for which the structure is maintained at 300° C. or more is three hours or more, a time for which the structure is maintained at 340° C. or more is one hour or more, and cooling speed is 300° C./hour or less in the final annealing.

\* \* \* \* \*